United States Patent Office 3,047,590
Patented July 31, 1962

3,047,590
ACYLTHIO-HYDROXY-STEROIDS AND
PREPARATION THEREOF
Taichiro Komeno, Sumiyoshi-ku, Osaka-shi, Japan, assignor to Shionogi & Co., Ltd., Osaka-shi, Japan
No Drawing. Filed July 22, 1960, Ser. No. 44,546
Claims priority, application Japan July 27, 1959
3 Claims. (Cl. 260—397.4)

This invention relates to acylthio-hydroxy-steroids and methods for their preparation. More particularly, the invention concerns a novel method for the preparation of novel acylthio-hydroxy-steroids, which are useful as intermediates in the synthesis of effective hormonal drugs.

Recently, biochemical activity of organic compounds containing sulfur has been noted and some attempts have been made to introduce an acylthio group into the steroid nucleus. For example, R. M. Dodson et al. had reported as to addition of alkanethiolic acids to $\Delta^{1,4}$-3-oxo- and $\Delta^{4,6}$-3-oxo-steroids.

It has been found, however, in accordance with the present invention that an epoxy linkage on the steroid nucleus is cleaved by alkanethiolic acid and converted to an acylthio group and a hydroxyl group. Namely, the epoxy-steroid can be converted by treatment with alkanethiolic acid to the corresponding steroid having an acylthio group and a hydroxyl group on the nucleus, and the latter can be converted to the corresponding steroid having effective therapeutic activities by further treatment.

The reaction involving the addition of alkanethiolic acid to a steroid having an epoxy-group has been never reported in the literature and is novel. Moreover, the products of this invention and their physiological activities are novel, too.

Accordingly, it is the fundamental object of this invention to provide one step of a method whereby introduction of sulfur-containing group is made possible at a desired position on the steroid nucleus. Another object of the invention is the provision of acylthio-hydroxy-steroids and a method of producing them. A further object of the invention is to provide a method for cleaving an epoxy linkage on a steroid nucleus.

The method of the present invention is generally applicable to the epoxy-steroids of the androstane, pregnane, cholane and cholestane series. The number and position of epoxy-linkages have substantially no effect on the reaction.

The reaction of the present invention may be carried out by treating the epoxy-steroid with excess of alkanethiolic acid. The operation of the present invention may be carried out by dissolving the epoxy-steroid in alkanethiolic acid and allowing the solution to stand at room temperature. Alternatively, heating may be effected as required. Although the reaction does not need any solvent in usual cases, the employment of a suitable inert solvent may be advantageous in some cases.

The product obtained is a steroid having an acylthio group and a hydroxy group at the positions which were occupied by the epoxy group in the starting material.

Thus obtained acyl-thio-hydroxy-steroids are useful as intermediates in the synthesis of medicinal sulfur-containing steroids.

For example, 5α-hydroxy-6β-acetylthio-pregnane-3,20-dione, which is obtained by application of the method of the present invention to 5α,6α-epoxy-pregnane-3,20-dione, can be converted into 6β-acetylthio-4-pregnene-3,20-dione by dehydration.

The progestational activity of this compound is slightly lower than progesterone. The pituitary gonadotrophin inhibition is, however, ten times as great as progesterone in potency.

Thus, the compound is useful as:
(1) Controlling agent for diseases of menopause,
(2) Ovulation-inhibition agent or contraceptive agent,
(3) Controlling agent for hypergonadism or precocious puberty.

In analogous manner, any of the other intermediates of the instant invention can be converted to the corresponding end-product.

The following specific examples serve to illustrate this invention, but are not intended to limit the same.

Example 1

1.56 g. of 3β-acetoxy-5α,6α-epoxy-cholestane were dissolved in 6 ml. of ethanethiolic acid, refluxed for 15 hours, and extracted with ether. The extract was washed with water, dried, and evaporated. Treating the residue with methanol, the crude crystals obtained were recrystallized from diluted acetone to yield 1.37 g. of 3β-acetoxy-5α-hydroxy-6β-acetylthio-cholestane as scales, M.P. 135–137° C.

I.R. (Nujol), μ: 2.90, 2.99 (OH); 5.77, 5.84, 7.78, 8.01 (OAc); 5.91, 8.98 (SAc). U.V. (EtOH), mμ: 235 (ε: 58.50). $[\alpha]_D^{23}$ —67°±2° (c.: 1.008 chloroform).

Analysis.—Calcd. for $C_{31}H_{52}O_4S$: C, 71.49; H, 10.06; S, 6.16. Found: C, 71.59; H, 10.09; S, 6.09.

Example 2

6.2 g. of 5α,6α-epoxy-pregnane-3,20-dione 3,20-diethylene-ketal were dissolved in 32 ml. of ethanethiolic acid, and allowed to stand for 114 hours at room temperature, and evaporated in vacuo. To the residue, 5 ml. of acetic acid and 20 ml. of water were added and heated on a water bath. Distilling off acetic acid in vacuo, crystals precipitated were collected by filtration, washed with water, and dried. Subsequently, the crystals were dissolved in 20 ml. of pyridine and 10 ml. of acetic anhydride, and heated on a water bath, again. The crude product obtained by the addition of water was recrystallized from acetone to give 4 g. of 5α-hydroxy-6β-acetylthio-pregnane-3,20-dione as prisms, M.P. 227–229° C.

The mother liquor was chromatographed on alumina. The fraction eluted with petr. ether-benzene and benzene only, gave 560 mg. of 6β-acetylthio-4-pregnene-3,20-dione as needles, M.P. 175–185° C. Then, the fraction eluted with benzene-ether and ether-chloroform gave additional 370 mg. of 5α-hydroxy-6β-acetylthio-pregnane-3,20-dione. Total yield of 5α-hydroxy-6β-acetylthio-pregnane-3,20-dione, 4.37 g.

I.R. (Nujol), μ: 3.09 (OH); 5.86, 5.91 (3,20-dione); 5.96, 8.91 (SAc). U.V. (EtOH), mμ: 234 (ε: 5890). $[\alpha]_D^{23}$ —27°±2° (c.: 1.13 chloroform).

Analysis.—Calcd. for $C_{23}H_{34}O_4S$: C, 67.94; H, 8.43; S, 7.89. Found: C, 67.87; H. 8.30; S, 7.84.

Example 3

130 mg. of 2β,3β-epoxy-5β,22β-spirostane were dissolved in 2 ml. of ethanethiolicacid, heated for 2 hours on a water bath, and evaporated in vacuo. Treating the residue with methanol, 132 mg. of crude crystals of 2α-acetylthio-3β-hydroxy-5β-22β-spirostane were obtained, M.P. 200–209° C.

The M.P. of the product was raised to 213–215° C. by recrystallization from acetone.

I.R. (Nujol), μ: 2.84 (OH); 5.99, 8.83 (SAc). U.V. (EtOH), mμ: 233 (ε: 5230).

Analysis.—Calcd. for $C_{29}H_{46}O_4S$: C, 70.98; H, 9.45; S, 6.53. Found: C. 71.28; H, 9.60; S, 6.26.

Various changes and modifications may be made in the method of the present invention without departing from the spirit or scope thereof, and it is to be understood that it is limited only as defined in the appended claims.

Thus describing my invention, I claim:

1. 5α-hydroxy-6β-acetylthio-pregnane-3,20-dione.

2. A process for preparing 5α-hydroxy-6β-acetylthio-pregnane-3,20-dione which comprises reacting 5α,6α-epoxy-pregnane-3,20-dione 3,20-diethylene-ketal with ethanethiolic acid, whereby 5α-hydroxy-6β-acetylthio-pregnane-3,20-dione is produced, and recovering the latter from the reaction mixture.

3. A process for preparing a lower hydrocarbon acylthio-hydroxy-pregnane wherein the lower hydrocarbon acylthio and hydroxy groups have respectively different configurations, which comprises reacting an epoxy-pregnane wherein the epoxy radical is positioned at adjacent nuclear positions and which is free of substituents at the positions, other than the 17-position, occupied by the epoxy group, with a lower alkane-thiolic acid of the formula

RCOSH wherein R is lower alkyl, whereby the corresponding lower hydrocarbon acylthio-hydroxy-pregnane is produced wherein the lower hydrocarbon acylthio and hydroxy groups are in the positions occupied by the epoxy radical in the starting epoxy-steroid but have different configurations with respect to each other.

References Cited in the file of this patent

UNITED STATES PATENTS

| | | |
|---|---|---|
| 2,946,786 | Baran | July 26, 1960 |
| 2,982,777 | Loechel et al. | May 2, 1961 |

OTHER REFERENCES

Fieser et al.: Steroids, Reinhold Pub. Corp., New York, N.Y., page 142 (1959).

Beyler et al.: J.A.C.S. 82, 178–182 (January 1960).

Bollinger et al.: Chem. and Industry (April 1960), pp. 441–2.

Kirk et al.: J. Chem. Soc. (June 1960), pp. 2385–2388.

Hoffsommer et al.: Chem. and Industry (February 1961), pp. 251–2.